Aug. 10, 1937.   J. SCHWARTZMAN   2,089,301

WIRE ASSEMBLING DEVICE

Original Filed Feb. 21, 1935

INVENTOR.
Jacob Schwartzman,
BY
ATTORNEYS.

Patented Aug. 10, 1937

2,089,301

UNITED STATES PATENT OFFICE 2,089,301

WIRE ASSEMBLING DEVICE

Jacob Schwartzman, Brooklyn, N. Y., assignor to The Moore Company, Muncie, Ind., a corporation of Indiana Application February 21, 1935, Serial No. 7,467
Renewed August 5, 1936

10 Claims. (Cl. 5—267)

The invention relates to devices for assembling wires and more particularly for assembling wire springs such as used in the upholstery art. It has for its main object to provide a device by means of which such wire springs may be assembled and built up into units, such as for example, inner springs for mattresses, furniture, automobile seats and the like, with a minimum expenditure of time and labor.

Another object is to so construct the devices that they not only will constitute means for assembling the various springs in such units, but will themselves form springs which will cover the openings in and between the springs and thus add to the resiliency of the units. A further object is to so construct the devices that they may be employed with all the various kinds of springs employed in such units and be used for assembling the springs in all the various combinations of spacings now used in the art. A still further object is to so construct the devices that they will distribute the effect of any weight placed on any such unit over a great many more of the individual springs than is ordinarily the case.

Additional objects are to provide devices of simple construction which will effectively hold the springs to which attached in their proper place, which will eliminate noise, which will reduce wear in the units in which employed, and which can be manufactured at a low cost.

Figure 1:
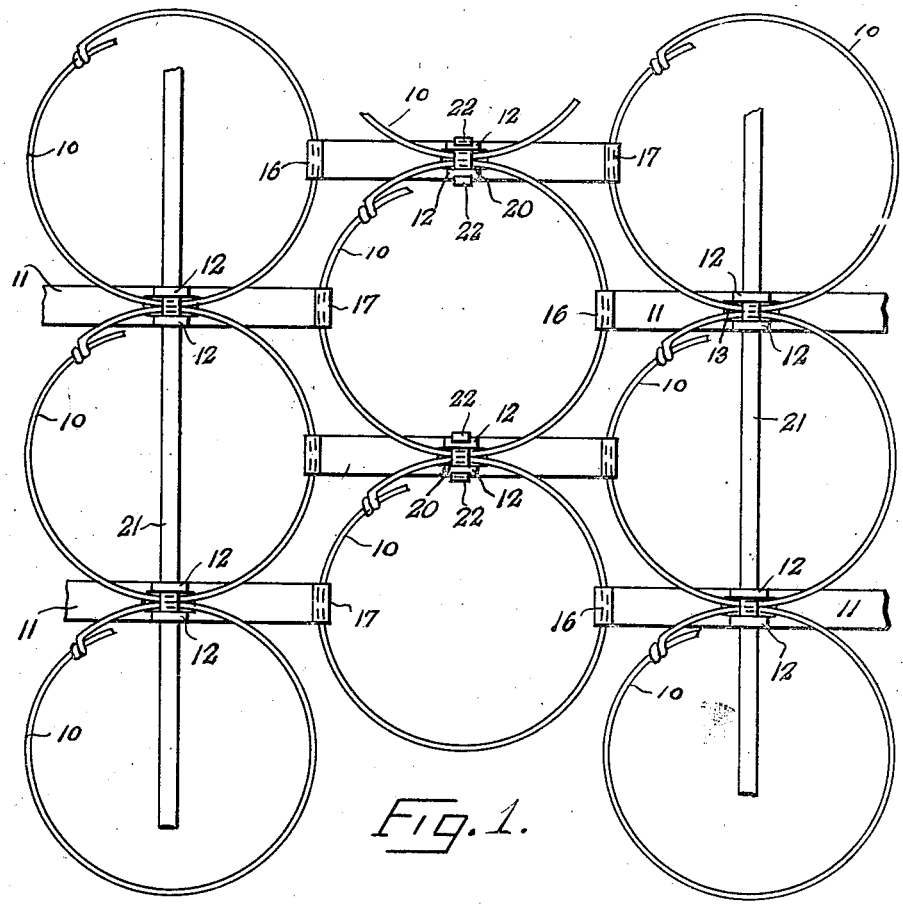

These and various other objects and advantages will be readily understood from the following description and from the accompanying drawing of preferred embodiments of the invention, in which, however, modifications may be made without departing from the scope of the appended claims. In the drawing Fig. 1 shows a plurality of upholstery springs to which the assembling devices have been attached, Fig. 2 is a plan view of one of the assembling devices, Fig. 3 is a side view of same, and Fig. 4, another side view of the device shown prior to its attachment to the springs.

Referring now to all the views, simultaneously, a plurality of upholstery springs are indicated at 10 but only the upper convolutions of the springs are shown. The assembling device itself is formed from a flat strip of metal 11 in the center of which spaced sockets 12 are formed. The sockets are preferably spaced by punching a rectangular slot 13 in the strip prior to forming the sockets. Similar spaced sockets 14 and 15 are formed near each end of the strip, and the strip itself is bent as shown at 16 and 17 to form loops for receiving the wires of the springs 10.

Figures 2, 3:
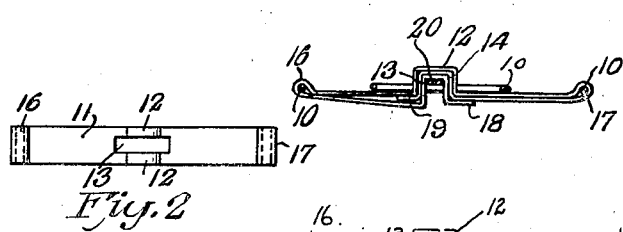
Figure 4:
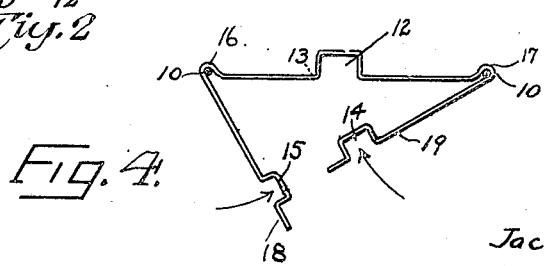

The device is attached to the springs in the manner plainly shown in Figs. 3 and 4. The ends 18 and 19 are first slipped over the springs 10 after which the end 19 is moved in the direction indicated by the arrow, until the sockets 14 nest in the center sockets 12. Next the arm 18 is bent in the direction indicated by the other arrow until the sockets 15 nest in the sockets 14. The wires of two adjacent coils are next inserted between the sockets, as plainly shown in Fig. 1, and a transverse member 20 inserted through the sockets above the convolutions of the springs, as plainly shown in Fig. 3.

These transverse members may either be short individual pieces, as shown at 20, or they may be long strips 21 passing through a plurality of sockets. When short pieces are used the ends 22 are bent over the sockets, as plainly shown in Fig. 1.

While I have shown and illustrated the invention in connection with upholstery springs of a certain type, it is evident that it may be used with various other springs used in the upholstery art. I do not therefore wish to limit the invention to any particular kind of upholstery springs.

Having described the invention and its objects, what I claim as new and wish to protect by Letters Patent is:

1. A device for connecting upholstery springs comprising a metal strip; aligned and spaced sockets formed cross-wise on said strip at its center and near both ends; two loops for receiving wires formed intermediate of the sockets; the sockets of one end adapted to be nested in the sockets at the center of the strip; the sockets of the other end adapted to be nested in the sockets of the first end after the sockets of that end are nested in the sockets at the center of the strip; and the sockets when so nested adapted to receive a transverse member to hold wires clamped between the transverse member and the strip.

2. A device for connecting upholstery springs comprising a metal strip; aligned and spaced U-shaped sockets formed cross-wise on said strip at its center and near both ends; two loops for receiving wires formed intermediate of the sockets; the sockets of one end adapted to be nested in the sockets at the center of the strip; the sockets of the other end adapted to be nested in the sockets of the first end afer the sockets of that end are nested in the sockets at the center of the strip; and the sockets when so nested adapted to receive a rectangular transverse member to hold wires clamped between the transverse member and the strip.

3. In an upholstery unit; a plurality of upholstery springs; a plurality of devices for connecting said upholstery springs, each of said devices comprising a metal strip having aligned and spaced sockets formed cross-wise at the center and near both ends, two loops formed intermediate of the sockets, the sockets of one end nested in the sockets at the center of the strip, the sockets of the other end nested in the sockets of the first end after the sockets of that end are nested in the sockets at the center of the strip, the loops of the assembling devices clamped to the top convolutions of two spaced upholstery springs, the top convolutions of two adjacent upholstery springs inserted between the sockets; and transverse members inserted in the sockets for clamping the last-mentioned springs to the strip.

4. In an upholstery unit; a plurality of upholstery springs; a plurality of devices for connecting said upholstery springs, each of said devices comprising a metal strip having aligned and spaced sockets formed cross-wise at the center and near both ends, two loops formed intermediate of the sockets, the sockets of one end nested in the sockets at the center of the strip, the sockets of the other end nested in the sockets of the first end after the sockets of that end are nested in the sockets at the center of the strip, the loops of the assembling devices clamped to the top convolutions of two spaced upholstery springs, the top convolutions of two adjacent upholstery springs inserted between the sockets; transverse members inserted in the sockets for clamping the last-mentioned springs to the strip; and each of said transverse members extending over a plurality of the springs.

5. In a spring assembly having parallel, longitudinal rows of compression springs arranged with the springs of adjacent rows in staggered relation and with the springs of alternate rows in transverse alinement, a connecting device comprising a member extending generally tangentially of adjoining springs in one row and having its ends attached respectively to alined springs in the two adjacent rows, and means securing said member to the two springs to which it is tangent.

6. In a spring assembly having parallel, longitudinal rows of compression springs arranged with the springs of adjacent rows in staggered relation and with the springs of alternate rows in transverse alinement, a connecting device comprising a metal strip having its ends doubled around transversely alined springs in two alternate rows and into superposed relationship with each other and the intermediate portion of the strip, and common means securing together the ends and intermediate portion of said strip and two adjacent springs in the row between said alternate rows.

7. In a spring assembly having parallel, longitudinal rows of compression springs arranged with the springs of adjacent rows in staggered relation and with the springs of alternate rows in transverse alinement, a connecting device comprising a metal strip having its ends doubled around transversely alined springs in two alternate rows and into superposed relationship with the intermediate portion of the strip, and common means securing together the ends and intermediate portion of said strip and two adjacent springs in the row between said alternate rows.

8. In a spring assembly having parallel, longitudinal rows of compression springs arranged with the springs of adjacent rows in staggered relation and with the springs of alternate rows in transverse alinement, a connecting device comprising a metal strip having near its center a pair of spaced, transversely alined offsets, said strip being disposed with turns of two adjacent springs in one row received in the space between said offsets, and a transverse retaining member extending through said offsets to clamp said spring turns in place between it and the body of the strip, the ends of said strip being secured to transversely alined springs in the two rows on opposite sides of said first named row.

9. A device for connecting upholstery springs, comprising a metal strip; a socket formed crosswise on said strip near its center; loops formed on both ends of said strip and adapted to receive wires; a transverse socket formed near the free end of each loop, the three said sockets interfitting and being adapted to receive a transverse retaining member for holding in place one or more wires clamped between the retaining member and the strip.

10. A device for locating upholstery springs, comprising a metal strip; a socket formed crosswise on said strip near its center, a loop formed on one end of said strip, a transverse socket formed near the free end of said loop, said sockets interfitting and being adapted to receive a transverse retaining member for holding in place one or more wires clamped between the retaining member and the strip.

JACOB SCHWARTZMAN.